3,332,752
COMPOSITE FLAME SPRAYING WIRE
Clyde S. Batchelor, Trumbull, and Warren R. Jensen, Stratford, Conn., assignors to Raybestos-Manhattan, Inc., Passaic, N.J., a corporation of New Jersey
Filed Oct. 2, 1963, Ser. No. 313,228
1 Claim. (Cl. 29—191.6)

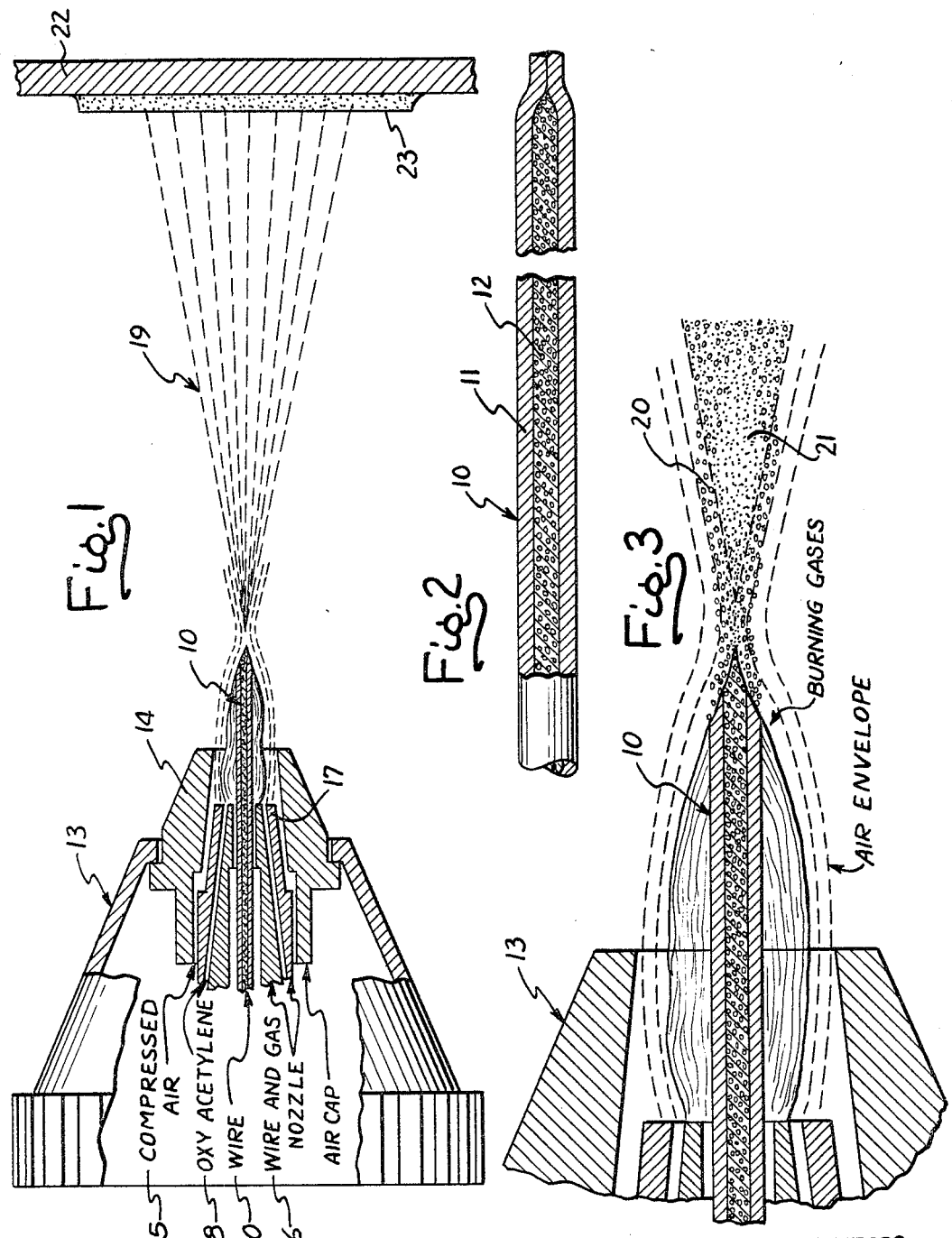

This invention relates to the flame spraying of substrates with metallic coatings, to the novel method and means for accomplishing the same and to the novel products resulting therefrom.

More particularly, the present invention relates to the flame spraying of a substrate which may be a planar, angular or curvilinear base of heat-resistant character such as bodies of metallic, ceramic or mineral-fiber character, with a coating of metal of a new and improved character, and it is an object of the present invention to provide metal coatings of the character aforesaid having inclusions of discrete particles of inorganic modifying material dispersed therein.

In general, the objects of the present invention are accomplished by providing novel composite flame spraying wire composed of a solid metal tube having disposed therein a body of discrete particles of inorganic modifying material having a voids content of at least about 25% the air voids aiding in providing a barrier against substantial disintegration of said inorganic material or substantial alloying thereof with the tube metal by keeping the particles discrete and to insulate them from the flame.

The composite flame spraying wire of the present invention is adapted to be sprayed by conventional spray guns at a temperature and at a rate to atomize at least the solid metal tube and to mechanically trap the modifying particle material inclusion without appreciable alloying of the solid metal component of the wire with the aforesaid modifying filler particle material or appreciable degradation of the latter.

It is presently known to employ flame spraying techniques and to provide composite deposits of materials such as, for example, ceramics and metallic materials by separately flame spraying the metal from a solid wire with the conventional wire flame spray or metallizing gun, and at the same time spraying the ceramic particle material from a different point and at an angle to the flame sprayed from a powder gun. In such operation the metal and the separately sprayed particle material are projected adjacent to each other and not in admixtures, except possibly in the overlapping areas of the sprayed cones resulting from the flame spraying technique.

As distinguished from the prior practices and when employing the composite flame spraying wire of the present invention, greater efficiencies are obtained, that is, loss of sprayed metal and particularly loss of the modifying material, is materially reduced and more uniform mixtures are obtained. Employment of the present composite tubes is particularly advantageous when employing particle material such as ceramics or graphite of lower gravity or finely divided particles of any gravity within the metal tube and which normally tend to disperse on spraying.

In the present case with the spray having a surrounding coating or conical zone of metallic particles resulting from the metal tube of the composite wire, and wherein the modifying particles disposed within the tube tends to be retained within said zone and adjacent the axis of the spray, their application onto the sprayed surface tends to be more confined, with the lesser volume of filler particles tending to become overlayed with the metal of the tube. Thus with the employment of the composite flame spraying wire of the present invention better and truer mixtures are obtained in an easy and more positive manner as distinguished from layers, since even when spraying two materials simultaneously at an angle to each other it is difficult to have both meet, and one component tends to blow the other away, resulting in wastage. This is distinguished from the practice of the present invention in which use of the composite wire provides an enveloping and trap-like spray of metal formed from the tube around the sprayed particle material resulting from that disposed within the hollow of the composite flame spraying wire of the present invention.

Moreover, employment of conventional spray guns can be operated at a controlled feed rate and temperature such as to melt and atomize the metal tube, the flame and feed rate being regulated so as to be insufficient to appreciably degrade the contained modifying particle materials or to substantially alloy them with or dissolve them in the metal of the tube.

The provision of the composite flame spraying wire of the present invention, wherein the enveloping tube is composed of solid metal is particularly conducive to the production of densified deposits as distinguished from the relatively porous character of the deposits resulting from the flame spraying of solid metal tubes. This is believed to result from the fact that the heat generated at the nozzle of the spray gun goes through the wall of the tube rapidly as distinguished from the requirement to travel through a solid rod, and results in a more uniform distribution of the heat into and through the metal tube. Moreover, this metal which is atomized and propelled by gas under pressure at substantially the same time that it is melted, due to its having been uniformly heated, apparently has a more plastic flow when the particles thereof land on the substrate enabling these sprayed particles to become deposited in a dense even though mechanically interlocked mass of particles and to provide better anchoring and interlock of the contained modifying particle material which is simultaneously deposited. In the flame spraying operation, the composite tube of the present invention is caused to protrude roughly about ¼ inch beyond the nozzle. This initially shields the fillers except those in actual physical contact with the tube. The fillers near the center of the tube are protected initially by the air voids from rapid heating. After the tube has melted away the fillers are subjected to heat but for extremely short periods of time. This is adequate to melt or plasticize an appreciable portion of the filler particle materials which are susceptible to melting or plasticization at the temperature of the generated heat or flame of the spray gun consistent with insulation thereof by the tube per se and the insulating effect of the air voids.

The tube component of the composite wire of the present invention may be composed of metal such as principally of copper, aluminum, or iron, the latter including steel. The inorganic filler particles are selected principally to reinforce or otherwise modify the tube metal by providing a sprayed composite deposit of the metals with improved properties such as improved real or apparent hardness, improved wearing characteristics and corrosion resistance. In such instances the fillers are generally of higher melting point and greater hardness than the metal tube although the inorganic fillers may in other instances be of lubricating character used either alone or in combination with the relatively hard fillers when it is desired to provide lubricating properties. In general, the fillers are such that under the flame spraying conditions they do not substantially dissolve in or alloy with the tube metal nor become substantially degraded.

Moreover, the tube metal should generally comprise at least 50% and preferably 60% and upwards of the volume of the sprayed deposit so that the deposit is essentially composed of a matrix of the metal of the tube with modifying inclusions of the filler material.

The term "inorganic" as employed herein with reference to the filler materials will be understood to include broadly natural or synthetic minerals as well as metals and their alloys, and thus although the aforesaid relatively hard, high melting particle material inclusion can be refractory oxide particles such as alumina, zirconia, titania, beryllia, and the like, other particles such as a feldspar, mullite, tungsten carbide, silicon carbide and the like can also be employed. Likewise, particles of metal may also be employed such as nickel, chilled iron, steel, cobalt and the like.

Others which can be used either alone or in combination with the foregoing to serve as lubricants or friction modifying agents and the like are graphite, lead, molybdenum disulphide, babbit metals, lead-tin solders, and the like.

Other types of inorganic particles may be of composite character such as zinc, aluminum, copper and the like coated particles of graphite to serve to prevent oxidation of the graphite.

These inorganic particle materials are generally employed in sizes of from about 40 to about 600 mesh. Larger than 40 mesh causes particles to bounce away in spraying resulting in poor efficiency and undesirable porosity. Particles of smaller than about 600 mesh such as those of colloidal size while useful in some instances are generally undesirable in that they cause loss of efficiency and degradation in flame spraying.

However, the use of composite tubes with fillers of the character aforesaid in flame spraying permits the inclusion of metals and other inorganics that would normally alloy or decompose but because of the short time the filler material is exposed to the flame a minimum amount of alloying or degradation takes place.

The substrates may be components of friction mating surfaces such as flywheels, pressure plates, brake drums, vented and unvented brake discs, brake drums for band brakes and the like, which may be composed of ferrous materials such as iron or steel, copper, aluminum, or in the case of such materials as brake bands the substrate may be felted or woven fibrous asbestos.

These friction material substrates, in accordance with the present invention, are preferably sprayed with composite flame spraying wire of the present invention to provide friction material overlays composed principally of copper such as copper of 98% or higher purity with modifying inclusions to provide increase in effective hardness and resistance to abrasion and plastic flow of the copper, and thus provide wear-resistant surfaces without necessity for liquid cooling. At the same time there is minimizing of scoring and plasticizing of the copper metal and its mating surface, while obtaining and retaining the high heat conductivity of the copper. The metal-particle material inclusion is such as to avoid substantial alloying which might reduce the heat conducting properties of the copper.

The use of copper tubing having reinforcing particle inclusion therein is also desirable in the electrical field where high heat and electrical conductivity with improved wear is desired for the mating parts such as in commutators and other rotating electrical parts. In such instances the substrates may be ferrous metal, aluminum, copper or ceramics.

Tubes of ferrous material such as for example austenitic steel containing hardening particles such as tungsten carbide, or reinforcing particles such as alumina, zirconia, mullite or the like may be employed for providing metallic substrates such as shafts or other surfaces with tough, wear-resistant qualities. On the other hand, the inclusion in the various tubes can be of materials such as particles of copper, lead and the like to improve machining properties.

Composite wire wherein the tube component is of aluminum may be employed in the production of bearings, friction mating members and the like. Aluminum per se is notorious for galling, but in accordance with the present invention there can be readily included therein a relatively hard reinforcing particle material as aforesaid, to render aluminum suitable for friction material overlays and used in brakes, clutches and the like.

Other instances where use of aluminum composites of the present invention is feasible are in bearings and bearing surfaces where the inclusion is a lubricant material such as graphite, making it suitable for such uses as cylinder liners and the like, making use of sprayed aluminum feasible without seizing.

Although in general it is preferred to use the tube material of substantially pure character and to prevent alloying thereof with the contained modifying filler particle material, in some instances tubes composed of alloyed metal may be employed in the production of bearings of improved properties. Thus, tubes of brass or bronze, such as Phosphor bronze, yellow brass, Muntz metal and the like alloys, may be effectively employed for the tube component of the composite flame spraying wire of the present invention incorporating therein lubricating particle filler materials such as graphite, molybdenum disulphide, Babbit metal, and the like. The manufacture of such bearings has in the past been limited to expensive and complicated sintering processes employing sintering technology and has precluded the use of many lubricating materials such as those aforesaid.

The composite flame spraying wire of the present invention is particularly adapted to facilitate the production of bearing surfaces of the aforesaid character and other metallic overlays wherein the inclusions are of lower melting character than the tube or are unstable compounds at the 5000–6000° F. temperature generated by the oxyacetylene or other chemical flame of the spray gun, in that firstly the fillers are protected by the metallic sheath, and secondly by the air voids content of the filler body. Moreover, of course, control is had by varying the inside and outside diameters of the tube, the mesh size particles of the fillers and their quantity.

Thus in flame spraying, the metallic tube melts first and is atomized and hurled at the target piece or substrate along with the filler material which has been protected from the heat by both the outer shield of the metal tube and the air voids content of the body of particles filling the tube.

The method of the present invention thus also permits the inclusion of metals which might normally alloy with the tube metal but because of the short time that the filler material, even when it is metal, is exposed to the flame, little or no alloying will take place.

As previously indicated a characterizing feature of the present invention resides in disposing the body of inorganic modifying filler particle material in discrete particle form having at least about 25% air voids and which is thus readily disintegrable under conditions of flame spraying so that the particles while partially shielded are readily released under the influence of the flame and propelling gas. The employment of discrete particles permits control of the amount of additive material by control of particle size and densification of packing. Thus, for example, normal sifting and shaking of a body of 300 mesh size iron particles give the body an air volume of two-thirds. This air voids content goes down to about one-half under air pressure.

The metal tube may be filled by pouring the particle material into the tube with the aid of vibration, pressure or suction or a combination of these.

In all instances due to the flame spraying technique employed and the protection and rapid cooling of the particle material on leaving the gun in its passage to the substrate, no appreciable alloying is encountered and the fidelity of both the metal and the contained particle material is substantially retained.

In the accompanying drawings, FIG. 1 diagrammatically indicates the spraying of a composite flame spraying wire of the present invention onto a flat substrate.

FIG. 2 is a longitudinal section of the composite flame spraying wire of the present invention.

FIG. 3 is a relatively enlarged view of the end of the nozzle of the flame spraying gun and of the composite wire as it issues therefrom as it is atomized, illustrating the enveloping conical effect of the outer cone of atomized metal and the inwardly disposed issuing cone of disseminated modifying particle material inclusion.

Thus referring to the drawings, the flame spraying wire 10 of the present invention comprises a metal tube or jacket 11 which can have an outside diameter of 1/8 inch to fit a standard wire flame spraying gun and suitably has an inside diameter of about 1/16 inch filled with a suspension of adjuvant or modifying particle material 12. Spraying of the composite wire 10 which desirably is flexible and fed from a conventional reel, not shown, is diagrammatically shown in FIG. 1 by means of the nozzle generally indicated as 13 having an air cap 14 together with passages therein comprising the compressed air passage 15 between the air cap 14 and the nozzle part 16. The combustion gas 18 passes between the nozzle parts 16 and 17 which provides an axial orifice for supporting the composite wire 10 while being fed through the nozzle. The sources of combustion gases and compressible propelling gas, i.e. the air supply, being part of conventional metallizing guns is well understood and therefore not shown.

As diagrammatically shown, the composite wire projects outwardly of the nozzle preferably about 1/8 to about 1/4 inch and the metal tube should not atomize inside the nozzle, but rather come out of the gun first. The velocity of the air jet is highest as it emerges and rapidly drops off. The composite wire is typically fed at a speed of about 10 feet per minute. As soon as the tube melts the speed of its atomized particles is picked up terrifically, with the particles of the interior, to on the order of about 800 inches per second. The metal of the tube is exposed to the flame for about one-fourth of a second and as it goes through the flame the filler particle material is only exposed to the flame for about one-eighth of a second.

The resulting atomized spray 19 initially comprising an outer cone 20 and an inner cone 21 impinges at a right angle to the substrate 22 with high velocity and efficiency and with a better and truer mix than when separately spraying particle material and metal rod at angles converging to the work. In the latter practice one spray tends to blow the other away, whereas in the present method and with our novel composite wire, an enveloping trap-like spray of metal envelopes the contained particle material to provide a high and stable yield and a substantially homogeneous mixed surface coating 23, as distinguished from layers of the components. Although the substrate 22 is shown to be flat it will be understood that it may be curvilinear for parts such as bearings, brake shoes, brake drums, shafts and other curvilinear or cylindrical surfaces, and with such curvilinear surfaces it will be understood that the spray is to be in a general radial direction to the work, such radial projection being generally comprehended by the terminology in the following claims and being in a direction normal to the work.

It will be understood of course that when spraying metallic substrates, they are conventionally pre-heated before spraying, suitably cleaned or abraded and if desired sprayed with an underlay or flash of a spray metal such as for example molybdenum, as an aid in anchoring the deposit.

We have found that improved strength and ductility and good bond to ferrous or cuprous substrates can be obtained by including, within the metal tube, particles of silver solder also known as silver brazing alloys. A typical one is a 78% silver—28% copper eutectic melting at 1434° F. Other contain various percentages of silver, say 50% and above, melting at 1150–1550° F. and can additionally contain cadmium, zinc and tin. From about 5% to about 10% of such silver solder by volume of the total solids has been found adequate.

The resulting sprayed or overlaid substrate may be suitably heated to from about 1200 to about 1400° F. to improve both the bond and strength of the composite as is well understood in the flame spraying or metallizing art.

As an example of the component tube and efficiency thereof in flame spraying in accordance with the present practices, a copper tube of 1/8 inch in outside diameter and 1/16 inch inside diameter was filled with 12 parts by weight of white cast iron powder of finer than 60 mesh which produces a composite of 88% of copper and 12% of chilled iron, which are substantially equivalent to the same parts by volume. This was heat sprayed onto a preheated aluminum clutch plate which had been pre-sprayed with a flash of molybdenum, in a direction normal to the plate and with resulting yield of coating containing 90.01 parts by weight of copper and 9.99 parts of iron.

In another example employing 97.1 parts by weight of copper and 2.9 parts by weight of 600 mesh alumina with the copper in the form of a tube and the alumina within the tube, the yield of coating sprayed therefrom was 98.3 copper and 1.7 by weight of alumina, equal respectively to 93.4% and 6.6% by volume.

On the other hand, by separately spraying a solid copper wire and alundum from two separate guns angled to each other, only 0.1% by weight of Alundum is obtained in the deposit due to the low gravity of the alumina and loss thereof on the flame spraying and atomizing blaze.

As a further example of the practice of our invention, a shot blasted clutch pressure plate composed of steel is first sprayed with a layer of .0005 to .001 inch of molybdenum on the operating face which is the well known method of improving the bond strength of a flame sprayed metal. Although this is desirable it is not essential to the present invention since good bond to the backing can herein be obtained without the molybdenum.

The spray gun is then loaded with copper tubing of 99% purity, of 1/8 inch outside diameter and 1/16 inch inside diameter, which has been filled with 80 mesh white iron grit. Analysis of the composite tube is 75% copper and 25% white iron by weight, equivalent to approximately 72% of copper by volume and 28% of white iron by volume. This tube was incorporated in a standard spray gun and sprayed in conventional manner with the aid of an oxyacetylene flame and compressed air with adjustment for speed to compensate for the partially hollow core due to its content of non-solid or particle material. The material was deposited at conventional speeds with the 80 mesh particle inlay and had a final sprayed thickness of .070 inch and differed little in appearance from a non-chilled iron containing deposit. When the deposit is machined however, very uniformly dispersed, unalloyed, particles of white iron grit are readily visible. Under a microscope it appears that the iron may be flattened but still retains a three dimensional particle shape. The iron seems to still be in the form of white cast iron which taken in conjunction with the lack of appreciable deformation of the particle would indicate that the iron had not reached a very high temperature and that the copper wall had provided both a baffle and an air gap preventing the 5000° F.–6000° F. oxy-acetylene flame cone from heating the iron up to its melting point.

We believe that the temperature of the particles did not exceed 1400° F. and that this heat did not penetrate the particle appreciably but this is not conclusive. The clutch was tested on a dynamometer on a schedule which would normally cause pure copper to score, gall and plasticize. In this test no plasticizing or galling occurred and only two light score lines were found. The wear on the friction material was less than half that normally found with cast iron pressure plates.

A set of brake drums of aluminum, were machined .060 inch oversize and were then sprayed with ⅛ inch copper tubing with a .025 inch thick wall filled with an amount of 100 mesh graphite and 600 mesh alundum to produce an ultimate wire analysis by weight of 86% copper, 7% graphite and 7% Alundum (equivalent respectively to 66.5%, 22%, and 12.5% by volume). The drums were machined with a Carboloy tool without difficulty to the final 10 inch drum diameter. The drums were put on a test car and a common asbestos lining was used and the assembly given a normal car test evaluation which includes 15 stops from 70 m.p.h. at rapid time intervals (about 23 seconds apart) followed by a six stop recovery. A thousand stop wear test follows the fade test. The performance during the test was extremely good with unusual stability being exhibited on the fade test. The drum assembly was relatively quiet and wear was about one-half that normally found with cast iron drums notwithstanding the fact that the set of aluminum drums were eighteen pounds lighter than the specified cast iron drums.

In the foregoing examples the sprayed copper deposit showed definite and slight increase in hardness above that of copper with no inclusions and there is a further slight gain in hardness after service. The greatest improvement is of course related to hot plastic flow since pure copper regardless of its temper will score and the surface will flow filling in any machined gaps or grooves in the friction contact faces very quickly.

With the practice of the present invention herein for example finely dispersed alundum is occluded with the deposit of copper, and it is found that scoring is either non-existent or negligible and that no hot plastic flow occurs.

In another example, a friction mating surface was produced on a cast iron friction disc by adding relatively hard particles of approximately 60 mesh chilled iron grit within the copper tube to provide an initial analysis of 12% by weight of the chilled iron and 88% by weight of copper, equivalent to 86% and 14% by volume respectivly. This was deposited as a slightly erose product having an analysis of about 10% of chilled iron and 90% of copper by weight. This material machined with carboloy to a relatively smooth surface with dispersed particles of white iron clearly visible. The particles under 100 magnification still show some of the massive cementite and pearlite of white iron. This material also functions well as a heavy duty mating face but we believe that the mechanics are different, for example, we find no evidence of hardening of the copper matrix either before or after operation. After service, the iron particle stands slightly proud on the friction surface. It is evident that the bearing has been concentrated in degree at least on these myriads of bearing points preventing scoring. We further surmise that resistance to plastic flow results primarily from the reinforcement of the dispersed large particles and perhaps to the supporting power of the particles which are raised above the plane of the copper matrix.

One of the most onerous chores on a caterpillar type vehicle is that of repairing the tread which in steel may weigh hundreds of pounds and additionally usually must be repaired under field conditions. The weight of these tracks causes rapid wear of bearings and fatigue failure of mounting shafts. It has long been recognized that the use of aluminum and its alloys would very substantially reduce the weight of the treads and much work has been done along these lines to such a point that several aluminum alloys are now considered to have sufficient strength and shock resistance to function satisfactorily. The surface and toes particularly of the treads are subject to gross wear and abrasion which in minutes ruins completely an unprotected aluminum tread.

We have found that if aluminum treads are shot blasted on all wearing areas and then a flash coat of molybdenum wire applied to the surface by routine metal wire spraying and following this a layer of austenitic metal with a 40 to 600 mesh particle of hard material such as tungsten or tantalum, carbide, alumina, zirconium oxide or mullite a good wear surface is produced. The austenitic material may be 18–8 stainless but is more preferably an austenitic manganese steel or one of its variants. The commonest austenic manganese steel is nominally C, 1.1%; Mn, 12%; Si, .2% and the balance Fe. Austenitic materials are characterized by their extreme toughness and ductility plus an ability to work harden when subject to abrasion or high unit loading. This work hardening is accomplished by plastic flow which is usually self limiting by virtue of its hardening and greatly increased yield point. The addition of a hard particle in mesh size of through 40 to 600 mesh serves to increase the wear resistance of the material and to appreciably lessen plastic flow while still maintaining much of the inherent toughness of the alloy.

In order to process an aluminum tread it is first desirable to provide a clean surface by degreasing following which the tread is shot blasted to a matte finish on all wearing areas. These shot blasted areas are then flame sprayed with a metallizing or flame spraying gun using molybdenum wire to produce a flash coat from .0003″ to .0015″ thick. Over this molybdenum flash coat a one-eighth inch coating with a final analysis of 18–8 (S.A.E. 304) 80% and 20% 100 mesh tungsten carbide is applied. The surface is then ground to clean up at about ³⁄₃₂″ finished thickness. The 18–8 matrix metal provides a tough shock-resistant matrix with good wear and abrasive resistance while the tungsten carbide provides further wear resistance and resistance to plastic flow. This austenitic-tungsten carbide overlay is produced by spraying 18–8 metal with an ⅛″ tube and a wall thickness of ¹⁄₃₂″ with the tube filled with 20% by weight of 100 mesh tungsten carbide on the 18–8 tube weight.

It will be apparent from the foregoing that by means of the novel composite wire hereinabove described one can at one time from a single source and in a novel and efficient manner coat a substrate with a matrix of metal of desired character which may be substantially pure or a predetermined alloy, and while substantially retaining the character of the aforesaid metal or alloy, incorporate therein a substantially discontinuous filler or inclusion which can be one which is of relatively hard and high melting point whereby the effective hardness, resistance to abrasion and plastic flow of the metal is increased providing wear-resistant surfaces useful, for example, in both the friction elements and mating members of friction couples such as brakes and clutches, electrical parts or other wearing surfaces. Again the discontinuous filler or inclusion may be of a lubricating nature thus to provide bearing surfaces of enhanced character or permit use of lubricant metal such as aluminum for bearings of novel character. Again various materials such as steel may have incorporated therewith particle materials which enhance machinability and provide surfaces of increased hardness and resistance to wear.

We claim:

A composite flame spraying wire composed of a metal tube and particles of a silver brazing alloy in combination with particles of at least one material selected from the group consisting of ceramic oxides and carbides, said particles being substantially uniformly disposed within the metallic tube.

References Cited

UNITED STATES PATENTS

| | | | |
|---|---|---|---|
| 2,137,471 | 11/1938 | Zublin | 219—145 |
| 2,319,977 | 5/1943 | Cape et al. | 219—76 |
| 2,359,401 | 10/1944 | Wulff | 117—46 |
| 2,700,091 | 1/1955 | Culbertson et al. | 219—146 |
| 2,888,740 | 6/1959 | Davis | 29—191.2 |
| 3,025,182 | 3/1962 | Schrewelius | 117—46 |
| 3,035,934 | 5/1962 | Cape | 117—46 |

FOREIGN PATENTS 228,798  5/1959  Australia.

ALFRED L. LEAVITT, *Primary Examiner.*

A. GOLIAN, *Assistant Examiner.*